United States Patent [19]

Ovnicek

[11] Patent Number: 5,253,715
[45] Date of Patent: Oct. 19, 1993

[54] HORSESHOE FOR TREATMENT OF LAME HORSES

[75] Inventor: Eugene D. Ovnicek, Columbia Falls, Mont.

[73] Assignee: World Wide Horseshoes, Inc., Whitefish, Mont.

[21] Appl. No.: 947,140

[22] Filed: Sep. 18, 1992

[51] Int. Cl.⁵ ................................................ A01L 7/02
[52] U.S. Cl. .......................................... 168/14; 168/28
[58] Field of Search ............................ 168/14, 26, 28

[56] References Cited

U.S. PATENT DOCUMENTS

| | | | |
|---|---|---|---|
| 322,861 | 7/1885 | Starkweather | 168/28 |
| 586,030 | 7/1897 | Hallanan | 168/28 |
| 660,427 | 10/1900 | Hallanan | 168/28 |
| 772,685 | 10/1904 | Symons | 168/14 |
| 1,050,526 | 1/1913 | Downs et al. | 168/28 |
| 1,407,379 | 2/1922 | Caryl | 168/28 |

Primary Examiner—Robert P. Swiatek
Attorney, Agent, or Firm—Harry M. Cross, Jr.

[57] ABSTRACT

The invention involves a combination hoof pad and horseshoe which raises the horse's heel and at the same time supports the coffin bone. The pad is wedge-shaped to be higher at the heel and lower at the toe. An insert support is located on the bottom of the pad such that it presses upwardly from the ground line to give support to the center of the coffin bone. The shoe portion of the remedial pad and shoe combination is provided with high heels thus raising the hoof heel to relax the flexor tendons. Relaxing the flexor tendons reduces pull on the coffin bone.

18 Claims, 3 Drawing Sheets

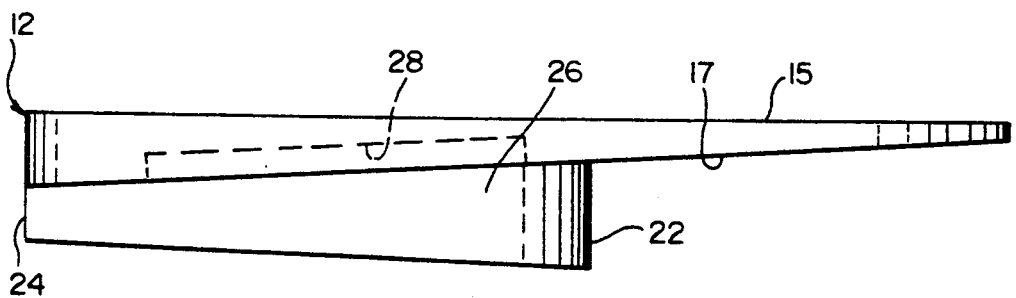
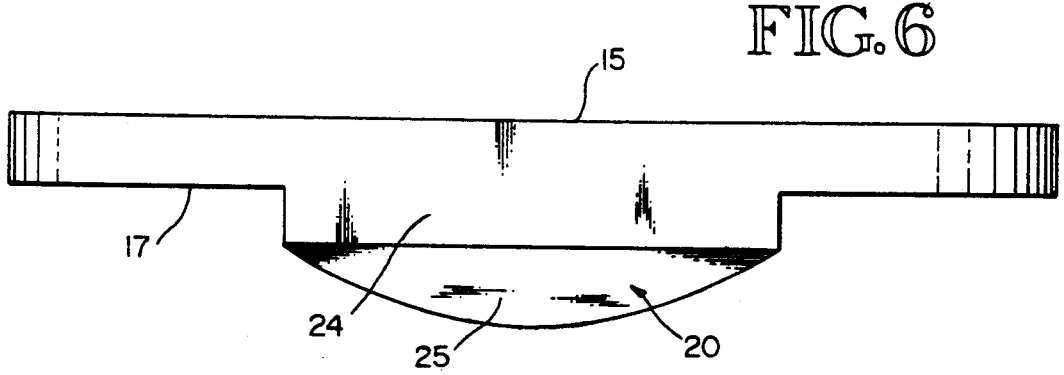

HORSESHOE FOR TREATMENT OF LAME HORSES

FIELD OF THE INVENTION

The invention relates generally to the field of farriery and more particularly to a horse shoe design for horse's hooves which is to be used in the treatment of founder and laminitis and other hoof and lower leg ailments in horses.

BACKGROUND OF THE INVENTION

Veterinarians and farriers are well acquainted with the varieties of lameness problems in horses. Two particularly vexing ailments of the hoof and lower leg are founder and laminitis, conditions which involve partial or complete separation of the coffin bone and inner hoof wall.

Treatment of laminitis and founder requires that several aspects of the problem be considered. One is that the fever created by the founder and the accompanying trauma causes the coffin bone and the hoof wall to disconnect or separate one from the other in whole or in part. A second condition is that the inflammation results in contraction of the flexor tendons which in turn tends to pull the coffin bone away from the inner face of the hoof wall. Thirdly, the downward pressure resulting from the horse's own weight causes rotation or displacement of the coffin bone. This bone displacement is aggravated by pressure applied to the toe of the hoof.

Hoof pads and various types of shoes have been designed to alleviate pain to the animal caused by founder and laminitis and to assist in the treatment process. So far as in known, however, no devices for hoof wear have been designed that have proven to be effective.

SUMMARY OF THE INVENTION

The invention involves a combination hoof pad and horseshoe which raises the horse's heel and at the same time supports the coffin bone. The pad is wedge-shaped to be higher at the heel and lower at the toe. An insert support is located on the bottom of the pad such that it presses upwardly from the ground line to give support to the center of the coffin bone. The shoe portion of the remedial pad and shoe combination is provided with high heels thus raising the hoof heel to relax the flexor tendons. Relaxing the flexor tendons reduces pull on the coffin bone.

Accordingly, it is among the features of the invention to provide a remedial shoe that is designed specifically to allow a horse to move even though its hoof is afflicted with laminitis or founder. The shoe offers support for a coffin bone that wholly or partially separated from the inner surface of the hoof wall. The shoe is uniquely simple but effective and long lasting. It is designed to flex and yet to relieve the flexor tendons from the kind of tension which exerts pull on the coffin bone to separate it from the hoof wall. Nails for the shoe can be placed more to the rear or posterior of the foot and thus further from the traumatized area. The shoe in providing center hoof support for the coffin bone also stimulates the blood supply to the hoof area.

BRIEF DESCRIPTION OF THE DRAWINGS

FIG. 5 is a side elevation view of the pad or sedge showing details of both insert and thinned flexing areas to the sides of the insert; and FIG. 6 is a rear elevation view of the pad of FIGS. 4 and 5.

DETAILED DESCRIPTION OF THE INVENTION

Figure 1:
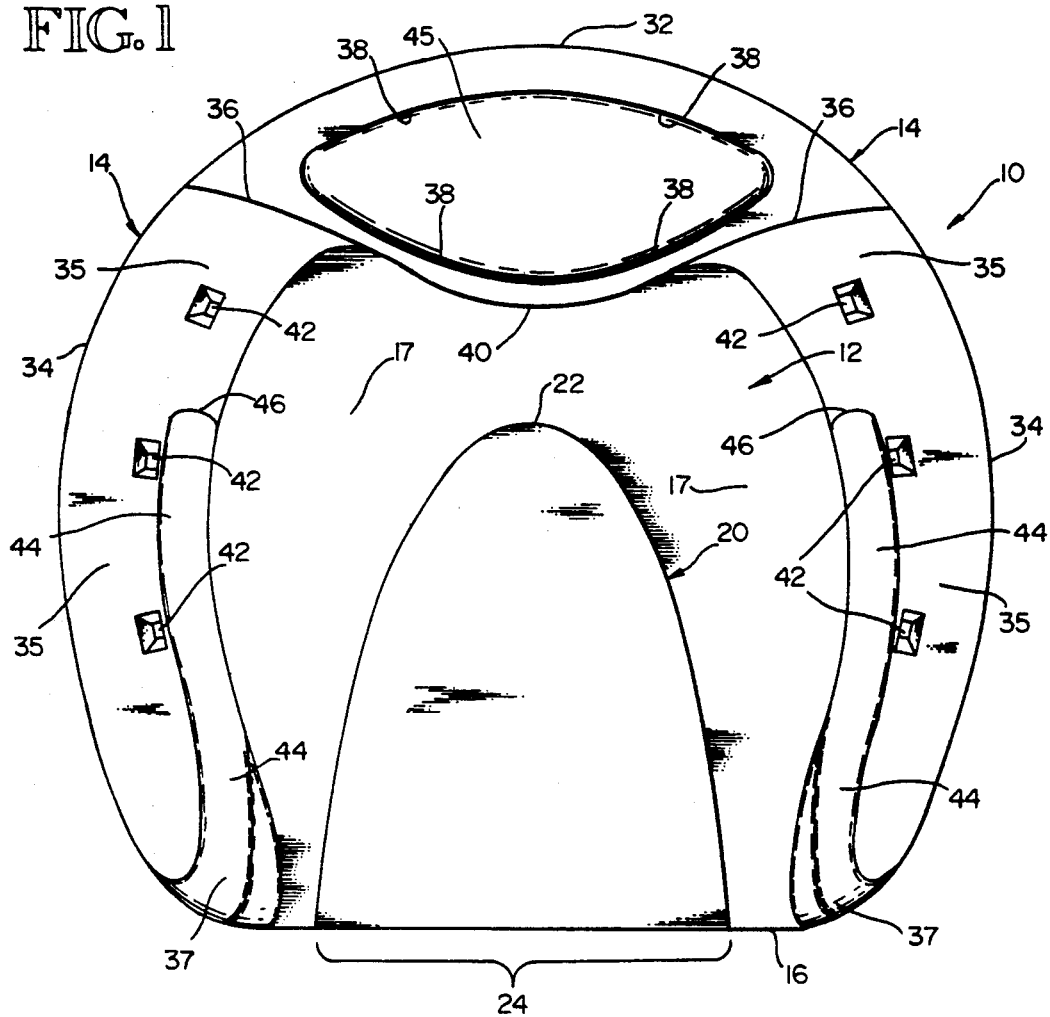
FIG. 1 is a bottom plan view showing the relationship of combination shoe and pad.

Referring now to the drawings it will be seen that the combination hoof pad and horseshoe, generally designated by the number 10, includes pad 12 and shoe 14.

The wedge-shaped pad 12 is thickest at its rear or heel end 16 and narrower at its toe end 18 and the overall shape is configured to the outside edges of shoe 14 which in turn is shaped to the outside edges of the hoof H. The rear end 16 of pad 12 is, for purposes of illustration, approximately 9/16 inches thick and 3/32 inches thick at the toe edge. Pad 12 has upper face 15 which contacts the bottom of hoof H and a bottom face 17 on the under side. It can be made of a tough rubber or plastic material which possesses some flexing capability.

Figure 2:
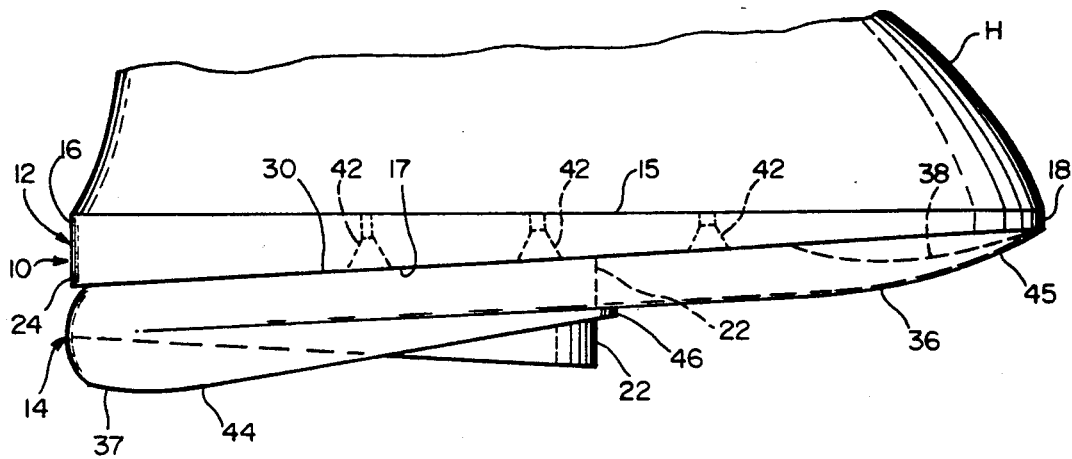
FIG. 2 is a side elevation view of the combination show and pad of FIG. 1.
Figure 3:
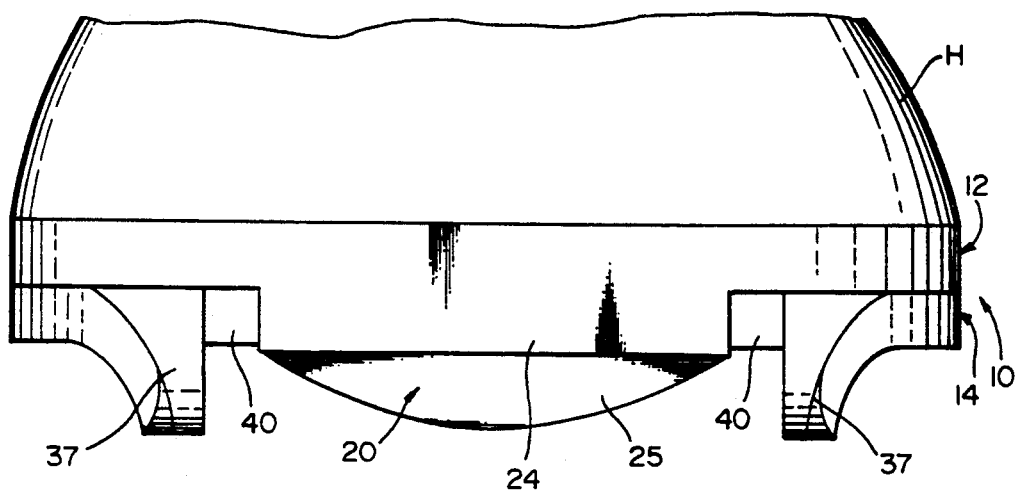
FIG. 3 is a rear elevation view of the combination shoe and pad of FIG. 1.
Figure 4:
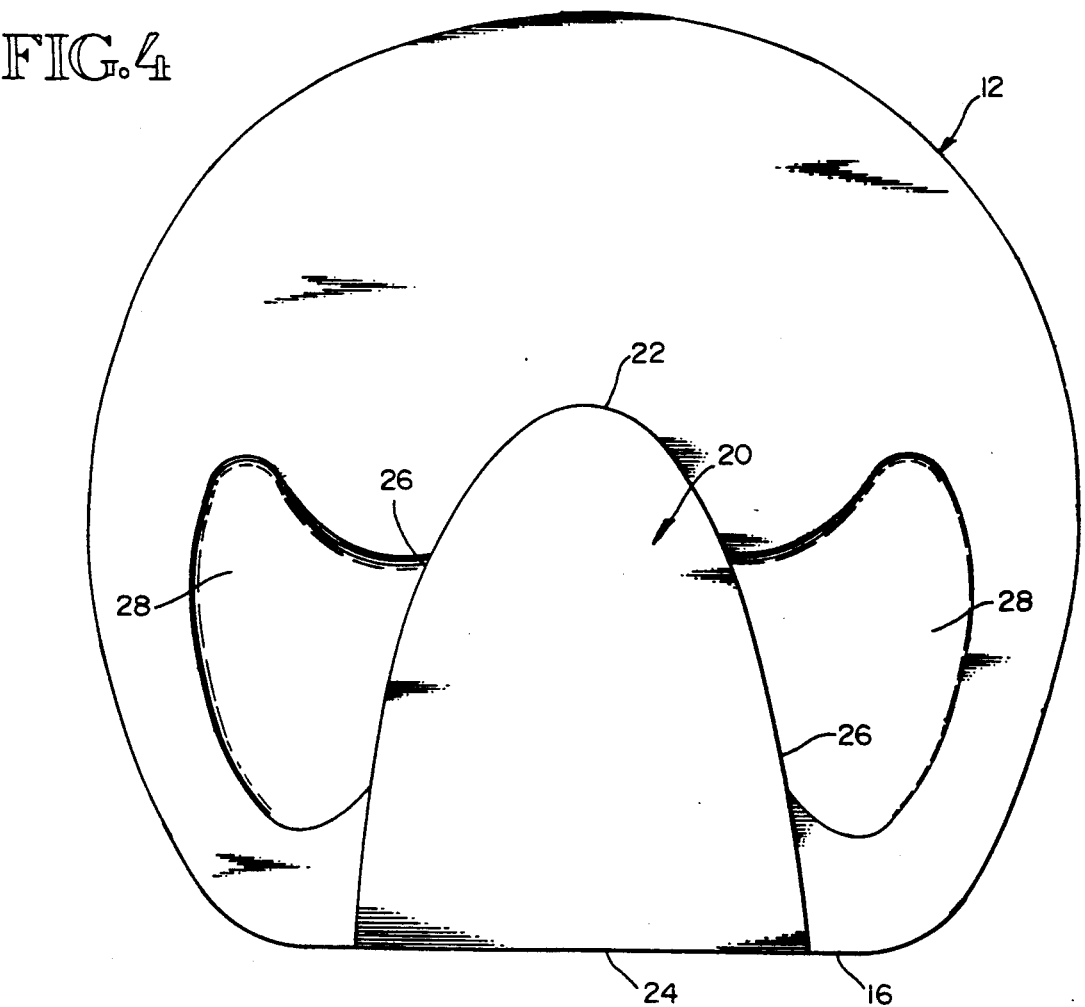
FIG. 4 is a bottom view of the pad showing additional details of its structure.

Integrally-formed with or securely attached to wedge shaped pad 12 is a wedge shaped frog insert 20 on the ground face of the pad and having inner tip end 22 and rear edge 24. It will be noted from the drawings that the frog insert is shaped like half of a long ellipse such that it has side arcuate edges 26 extending back from front end 22 to rear edge 24. It will be observed from FIG. 2 that frog insert 20 is also wedge shaped, being thinner at its rear edge 24 than at its tip edge 22. Reference is made here to FIGS. 2 and 5, particularly. In the illustrative drawings shown frog insert 20 is approximately 7/16 inches thick at rear edge 24 and about 11/16 inches thick at its inner end 22. Thus, a ground contact surface 25 is defined on insert 20 with the inner end 22 being located at a predetermined point under hoof H. Two irregularly shaped partial cut out areas 28 may be located on each side of frog insert 20 as is best seen in FIGS. 4 and 5 for reasons to be explained hereinafter. Cut outs 28 are not voids but are formed to about half the thickness of pad 12 to lend flexibility to frog insert 20.

Shoe 14 is a full rim device having planar upper surface 30, bottom surface 35, rounded toe portion 32, branches 34 and heels 37. The shoe body 14 is about ¼ inch thick but may be thinner or thicker as desired and formed of fiberglass, plastic, or of metal such as aluminum or steel. At the toe the shoe bevels approximately from lines 36 to a thickness of about ⅛ inch or less. Also, the toe area contains a concave section 38 on the upper surface with the toe area crowned downwardly on the bottom surface. It will be noted that the toe of body 14 widens at the rear edge to define a rear toe edge 40 such that concave section 38 is actually wider that the remainder of the shoe body sections.

Nail holes 42 for the shoe are located generally as shown in FIGS. 1 and 2. Heels 37 of the shoe portion 14 are raised approximately ⅛ inch, preferably inside the nail line, such that a ground contact surface 44 is formed extending to a forward point 46 which is located laterally of the tip 22 of the front insert. It will be seen that the rear portion of ground contact surface 44 is generally parallel to upper surface 30 for a distance of ¾ to 1 inch. Ground contact surface 44 then begins to angel upwardly toward forward point 46.

Reference to FIG. 2 shows that the forward part of frog insert 20 extends outwardly beyond what would be a straight ground surface line when the hoof is in full contact with the ground. It is contemplated that dimensions of the combination of pad and shoe may be varied depending on the treatment need of a particular horse. Thus, as is shown in the drawings, the forward portion of frog insert 20 when viewed from the side will extend about ¼ inch past the ground line GL. However, the distance by which the frog insert extends beyond the ground line may be either greater or less.

Insert 20 functions to support the coffin bone when the hoof is under load. Placement of the tip 22 must be generally located under the center of the coffin bone. As the hoof is loaded the front (anterior) of the insert is pressed by the ground up toward the bottom of the hoof. The insert thus forces the pad to flex upwardly to apply upward primary support for the center of the coffin bone. The partial cutout areas 28 at the sides of insert 20 enable the pad to flex more easily. Besides supporting the coffin bone, the insert also provides support for the rest of the subsolar surface. It has also been found that the invention provides stimulation of the vascular system and hence is an aid to blood circulation.

It will be appreciated that pad 12 may be wedged as described or it may be of one thickness but still provided with insert 20. Such flat pads may be used in less severe cases or in later treatment as healing of the hoof progresses.

The heels are raised and tapered forwardly to elevate the heels to relax tendon pull on the coffin bone. The raised ground contact surface 44 is formed on the inner edge of the branch so that it is inside the line of nail holes 42. Locating the ground contact surface as shown and described reduces stress on medial and lateral movement of the hoof. The nail holes are located more nearly to the posterior portion of the foot away from the traumatized area to give additional freedom to the coffin bone.

The beveled toe section 45 is designed to span the area directly across the tip of the coffin bone and not extend beyond the lamina tissue at the toe of the hoof. The toe area is widened and made concave on the hoof side as at 38 to provide protection and relief so that the coffin bone does not make contact with either shoe or pad.

Frog insert 20 is located so that it extends approximately ¼ to ¾ inch beyond a line from the last contact point of the heel and the first contact point of the toe. Stated another way, the insert is located so that tip 22 is positioned within ¼ to ¾ inch posteriorly of the anterior of the frog's origin.

While the preferred embodiment of the invention has been described herein, variations in the design may be made. The scope of the invention, therefore, is only to be limited by the claims appended hereto.

The embodiments of the invention in which an exclusive property is claimed are defined as follows:

1. A combination pad and horseshoe for treatment of lameness, comprising:
    a) a full hoof pad member generally shaped to the outside edges of a horse's hoof and made of resilient material and having an upper hoof contact surface and a bottom shoe mounting surface;
    b) an elongated frog insert means carried by said pad member and extending downwardly from said shoe mounting surface and shaped such that it has a rear edge generally coincident with said pad member, and such that it extends forwardly toward an opposite end of said pad member, and terminates at an inner tip end a predetermined distance from said rear edge at about the center of said pad member, said frog insert means being formed so that its rear edge will be spaced inwardly of the heels of a horseshoe mounted on the pad member and so that it extends longitudinally of said pad member whereby it will generally underlie the frog portion of a hoof to which the combination is applied;
    c) a horseshoe body member also being generally shaped to the edges of a horse's hoof including a toe area and rearwardly extending branch members with heel sections at the ends thereof, said body member having a planar upper surface for being mounted on said pad member and a lower surface; and
    d) heel means carried by each of the heel sections of said horseshoe body member each having a raised ground contact heel portion which extends downwardly and forwardly to provide an elongated ground contact surface sufficient to support a horse's foot with the heel thereof in an elevated position, said heel means and said frog insert means being so cooperatively constructed and arranged that the frog insert means rear edge is above the heel means ground contact surface and that the frog insert means inner tip end extends forwardly of said heel means and downwardly beyond a ground surface line when said heel means and said horseshoe body member are in full contact with the ground whereby when a horse's full weight is on a hoof shod with the combination the inner tip end of said frog insert means is pressed upwardly by the ground against the frog of the hoof to lend support to the coffin bone of the hoof and whereby the heel of the hoof is supported by said heel means in an elevated position.

2. The combination horseshoe and pad according to claim 1 and in which said toe area of said horseshoe body member is beveled on the lower surface thereof.

3. The combination horseshoe and pad according to claim 2 and wherein said raised heel portions angle forwardly and upwardly toward said lower surface of said body member.

4. The combination horseshoe and pad according to claim 3 and wherein areas of reduced thickness are formed on said pad member on each side of said frog insert means to assist in the flexibility of said pad member under hoof load whereby flexing of said pad member is facilitated such that said frog insert means tip end may be pressed against the frog of a hoof to which the combination is applied.

5. The combination horseshoe and pad according to claim 4 and wherein said inner tip end of said frog insert means is positioned to be located within ¼ to ¾ inches posteriorly of the anterior tip of the frog's origin.

6. The combination horseshoe and pad according to claim 5 and wherein said pad member is wedge shaped so as to be thicker at its rear end and thinner at its front end.

7. The combination horseshoe and pad according to claim 6 and in which said frog insert means is wedge shaped so that it is thinner at its rear end and thicker at its inner tip end such that the tip end extends beyond the ground line between the ground contact surface of the raised heel portions and the toe of said shoe.

8. The combination horseshoe and pad according to claim 1 and wherein said raised heel portions angle forwardly and upwardly toward said lower surface of said horseshoe body member.

9. The combination horseshoe and pad according to claim 1 and wherein areas of reduced thickness are formed on said pad member on each side of said frog insert means to assist in the flexibility of said pad member under hoof load whereby flexing of said pad member is facilitated such that said frog insert means tip end may be pressed against the frog of a hoof to which the combination is applied.

10. The combination horseshoe and pad according to claim 1 and wherein said inner tip end of said frog insert means is positioned to be located within $\frac{1}{4}$ to $\frac{3}{4}$ inches posteriorly of the anterior tip of the frog's origin.

11. The combination horseshoe and pad according to claim 1 and wherein said pad member is wedge shaped so as to be thicker at its rear end and thinner at its front end.

12. The combination horseshoe and pad according to claim 1 and in which said frog insert means is wedge shaped so that it is thinner at its rear end and thicker at its inner tip end such that the tip end extends beyond the ground line between the ground contact surface of the raised heel portions and the toe of said shoe.

13. A combination pad and horseshoe for treatment of lameness, comprising:
   a) a full hoof pad member generally shaped to the outside edges of a horse's hoof and made of resilient material and having an upper hoof contact surface and a bottom shoe mounting surface;
   b) an elongated frog insert means carried by said pad member and extending downwardly from said shoe mounting surface and shaped such that it has a rear edge generally coincident with said pad member, and such that it extends forwardly toward an opposite end of said pad member, and terminates at an inner tip end a predetermined distance from said rear edge at about the center of said pad member, said frog insert means being wedge shaped in thickness so that it is thinner at its rear edge and thicker at its inner tip end and so that its rear edge will be spaced inwardly of the heels of a horseshoe mounted on the pad member and so that it extends longitudinally of said pad member whereby it will generally underlie the frog portion of a hoof to which the combination is applied;
   c) a horseshoe body member also being generally shaped to the edges of a horse's hoof including a toe area and rearwardly extending branch members with heel sections at the ends thereof, said body member having a planar upper surface for being mounted on said pad member and a lower surface;
   d) heel means carried by each of the heel sections of said horseshoe body member each having a raised ground contact heel portion which extends downwardly and forwardly to provide an elongated ground contact surface sufficient to support a horse's foot with the heel thereof in an elevated position, said body further having nail holes therein arranged such that said raised heel portions are interiorly located with respect to said nail holes, said heel means and said frog insert means being so cooperatively constructed and arranged that the frog insert means rear edge is above the heel means ground contact surface and that the frog insert means inner tip end extends forwardly of said heel means and downwardly beyond a ground surface line when said heel means and said horseshoe body member are in full contact with the ground, whereby when a horse's full weight is on a hoof shod with the combination the inner tip end of said frog insert means is pressed upwardly by the ground against the frog of the hoof to lend support to the coffin bone of the hoof and whereby the heel of the hoof is supported by said heel means in an elevated position.

14. The combination horseshoe and pad according to claim 13 and in which said toe area of said horseshoe body member is beveled on the lower surface thereof.

15. The combination horseshoe and pad according to claim 13 and wherein said raised heel portions angle forwardly and upwardly toward said lower surface of said body member.

16. The combination horseshoe and pad according to claim 13 and wherein areas of reduced thickness are formed on said pad member on each side of said frog insert means to assist in the flexibility of said pad member under hoof load whereby flexing of said pad member is facilitated such that said frog insert means tip end may be pressed against the frog of a hoof to which the combination is applied.

17. The combination horseshoe and pad according to claim 13 and wherein said inner tip end of said frog insert means is positioned to be located within $\frac{1}{4}$ to $\frac{3}{4}$ inches posteriorly of the anterior tip of the frog's origin.

18. The combination horseshoe and pad according to claim 13 and wherein said pad member is wedge shaped so as to be thicker at its rear end and thinner at its front end.

* * * * *